Figure 3:
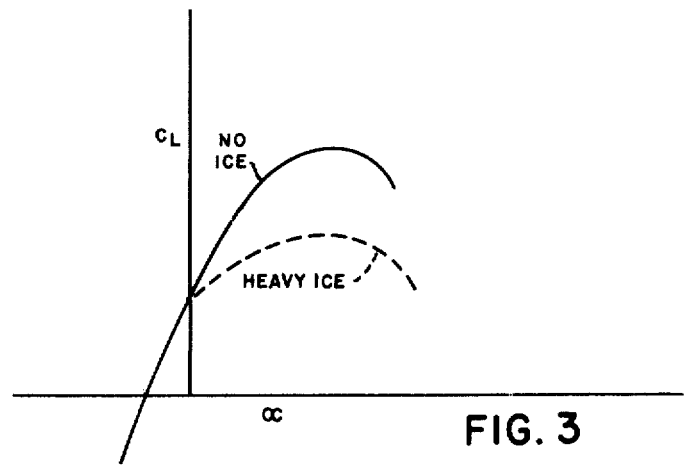

Aug. 27, 1957   R. G. STERN   2,803,893
SIMULATED WING ICING SYSTEMS FOR AIRCRAFT TRAINING APPARATUS
Filed June 15, 1954   2 Sheets-Sheet 1
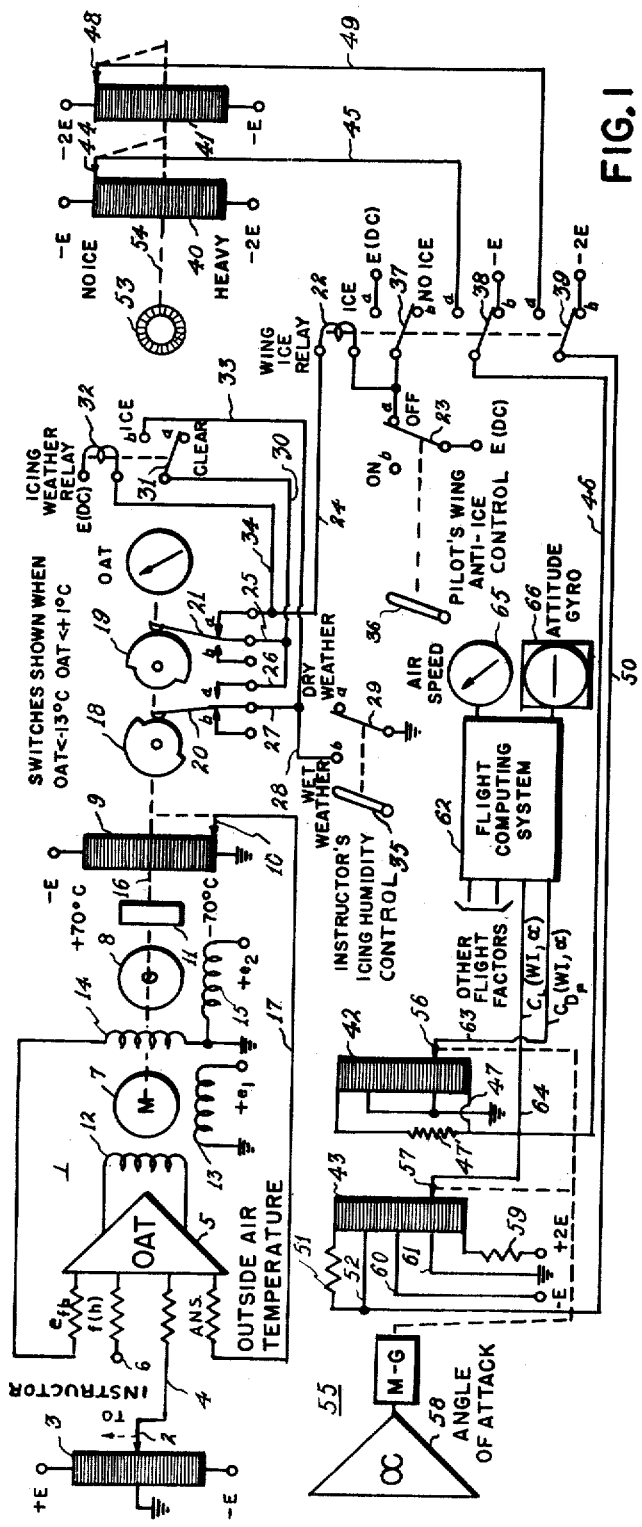
INVENTOR
Robert G. Stern
By Orin R. Swern
his attorney Aug. 27, 1957             R. G. STERN             2,803,893

SIMULATED WING ICING SYSTEMS FOR AIRCRAFT TRAINING APPARATUS

Filed June 15, 1954             2 Sheets-Sheet 2

INVENTOR
Robert G. Stern
By Orin R. Stern
his Attorney

United States Patent Office 2,803,893
Patented Aug. 27, 1957

2,803,893

SIMULATED WING ICING SYSTEMS FOR AIRCRAFT TRAINING APPARATUS

Robert G. Stern, West Caldwell, N. J., assignor to Curtiss-Wright Corporation, a corporation of Delaware Application June 15, 1954, Serial No. 436,928

14 Claims. (Cl. 35—12)

This invention relates to training apparatus for aircraft personnel for simulating various conditions of icing, such as wing icing, taking into account different weather and temperature conditions, and has for its principal object improved training apparatus that is useful in the teaching of proper methods of anti-icing and de-icing in the operation of aircraft under varying conditions of temperature and humidity.

The hazards of icing conditions in the operation of aircraft are well known, particularly in the case of wing-ice. The effect of wing-ice on flying characteristics is two fold: first the ice reduces the lift, and secondly it increases the drag. At low angles of attack (the angle between the wing chord and the line of flight), the ice does not appear to affect the lift coefficient materially but at high angles of attack the effect is quite pronounced. If the pilot is not aware of the wing ice, he is quite apt to stall the airplane inadvertently by increasing the angle of attack, as for a climb. It is therefore very important that aircraft personnel be thoroughly and realistically trained to take prompt and proper action in guarding against and/or combating dangerous icing conditions.

The invention will be more fully set forth in the following description referring to the accompanying drawings, and the features of novelty will be pointed out with particularity in the claims annexed to and forming part of this specification.

Figure 4:
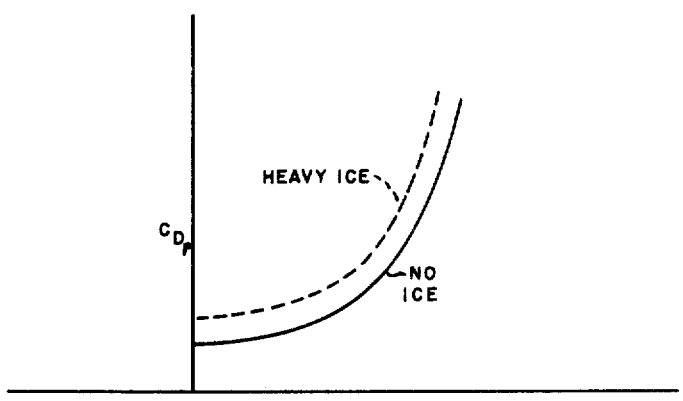

Referring to the drawings, Fig. 1 is a partly diagrammatic and schematic illustration of a simulated aircraft icing and anti-icing system embodying the present invention;

Fig. 2 is a modification of the system of Fig. 1 wherein in addition de-icing is simulated;

And Figs. 3 and 4 are curves graphically illustrating the effects of icing on airplane characteristics.

In Fig. 1 of the drawings, reference character 1 designates an outside air temperature servo (OAT) which is operated to compute outside air temperature according to supposed weather conditions predetermined by an instructor and according to simulated flight altitude. One input signal to the outside air temperature servo (OAT) is derived in accordance with the position of the slider contact 2 on the potentiometer 3 which potentiometer is energized as shown by positive and negative voltages $+E$ and $-E$ respectively at opposite ends and is grounded at the mid-point. The slider contact 2 is positioned by the instructor according to supposed temperature conditions and a voltage is derived at the slider contact and fed over line 4 to amplifier 5 of the servo 1 providing an input signal representing outside air temperature at sea level. The effect of altitude on outside air temperature is introduced into the operation of the (OAT) servo by means of a voltage supply at input terminal 6 of the OAT servo amplifier 5 which voltage may be derived in the manner shown in the copending application S. N. 436,478, filed June 14, 1954, by Robert G. Stern and William H. Dawson, Jr., for "Simulated Manifold Pressure System for Aircraft," and assigned to the same assignee as the present invention.

The simulated icing and anti-icing system includes two servo systems namely the outside air temperature servo system (OAT) which has already been mentioned and an angle of attack servo ($\alpha$) which will be considered hereinafter. The outside air temperature servo (OAT) and the angle of attack servo ($\alpha$) are similarly constructed and it is therefore necessary merely to describe one in detail. Selecting the outside air temperature servo (OAT) by way of example such servo includes servo amplifier 5 to which is applied the control signals hereinbefore mentioned, a motor 7 responsive to the amplifier output, a feedback generator 8 driven by the motor 7 and a potentiometer 9 having its slider contact 10 connected through a gear reduction box 11 to the motor generator combination. Servo amplifier 5 is a summing amplifier for determining the resultant of a plurality of input voltages and is of a type well-known in the art for algebraically summing a plurality of A. C. voltage of vary magnitude and polarity. A detailed circuit illustration is therefore unnecessary.

The servo motor 7 is of the two-phase type having a control phase 12 which is energized by the amplifier output and another phase 13 which is energized by a constant reference A. C. voltage $e_1$ de-phased 90° from the control voltage. The operation of this type of motor is well-known, rotation being in one direction when the control and reference voltages of the respective phases have the same instantaneous polarity, and in the opposite direction when the instantaneous polarity of the control voltage is reversed with respect to the reference voltage, the rate of rotation in both cases depending upon the magnitude of the control voltage. The generator 8 which is driven by the servo motor is a two-phased generator having one phase 14 energized by a 90° de-phased reference voltage $e_2$, the other phase 15 generating according to the motor speed a feedback voltage $e_{fb}$ for purposes of velocity control. In the angle of attack servo ($\alpha$) the motor generator combination has for purposes of simplicity been diagrammatically illustrated and indicated by the characters M—G.

The potentiometer resistance element 9 of the outside air temperature servo (OAT) and other potentiometers shown in the drawings may be of the well-known wound card type and are of circular band form in practice, but are diagrammatically illustrated in plane development for clarity. A structural arrangement which may be conveniently used for a servo motor and potentiometer combination of the character referred to is shown in Patent No. 2,431,749, issued December 2, 1947, to R. B. Grant for "Potentiometer Housing and Positioning Structure."

Potentiometer card 9 has its slider contact 10 positioned along the card by the servo motor which connects with the slider contact through the gear reduction box 11 and suitable mechanical connections 16. The slider contact derives, i. e. picks off potentiometer voltages depending upon the contact position, and the potentiometer is so shaped or contoured that the derived voltages at the slider contact bear a certain relationship to linear movement of the contact depending upon the particular function of the potentiometer. The potentiometer has a voltage impressed across its terminals depending as to instantaneous polarity and magnitude on the potentiometer function. In the case of potentiometer 9, such potentiometer is provided to serve as an answer card and the voltage derived at its slider contact 10 is fed over line 17 to the servo amplifier 5 to provide the answer signal ANS.

As stated, the outside air temperature servo (OAT) is operated in accordance with its control signals to compute outside air temperature. As shown, the outside air temperature servo (OAT) connects by means of the mechanical connection 16 with cams 18 and 19 so that the cams are positioned according to the computed values of outside air temperature. The cams 18 and 19 control the operation of contacts 20a and 20b, and 21a and 21b in such a manner that contact 20b is closed whenever the position of the (OAT) servo corresponds to a computed value for outside air temperature of less than −13° C. and contact 20a is closed when the servo position corresponds to a computed value of more than −13° C., whereas contact 21a is closed when the computed value of outside air temperature is less than 1° C. and contact 21b is closed whenever computed outside air temperature is greater than 1° C. The temperature conditions of −13° C. and +1° C. substantially define a temperature range in which ice may form on the wing of an aircraft providing wet weather prevails. If the temperature falls below −13° C. the humidity is so low that no ice additional to that already on the wings can form; however, ice existing on the wings will remain. When the outside air temperature is greater than 1° C., existing ice on the wing is caused to melt and fall off and no aditional ice can form unless the temperature subsequently drops.

The cams 18 and 19 at least partially control the operation of a wing ice relay 22 which relay determines whether the simulated icing and anti-icing system shall indicate the existence or the absence of wing ice. Wing ice is indicated only when the wing ice relay 22 is energized, the energization of relay 22 being determined in the manner now to be described.

An energizing circuit is provided for the wing ice relay extending from the D. C. voltage source E (D. C.) over switch contact 23a, the coil of relay 22, line 24, contact 21a, connections 25 and 26, contact 20a, connections 27 and 28, and switch contact 29b to ground provided switch contact arm 23 is in an "off" position, switch contact arm 29 is in a "wet weather" position, and the positions of the cams 18 and 19 correspond to a computed outside air temperature between the aforementioned limiting temperatures of −13° C. and +1° C. Another energizing circuit for the wing ice relay extends from the D. C. voltage source E (D. C.) over contact 23a, the coil of relay 22, line 24, contact 21a, line 30, contact 31b of an icing weather relay 32, line 33, connection 28, and contact 29b to ground provided contact arm 23 is in the "off" position, contact 29 is in the "wet weather" position, icing weather relay 32 is energized, and the cam positions correspond to a computed temperature of less than 1° C. It is thus immaterial to the energization of the wing ice relay 22 that the computed outside air temperature falls below −13° C. provided the icing weather relay 32 is energized. The icing weather relay 32 is controlled over an energizing circuit extending from the D. C. voltage source E (D. C.) over the relay coil, line 34, contact 21a, connections 25 and 26, contact 20a, connection 28, and contact 29b to ground. A holding circuit for maintaining the icing weather relay energized in the event contact 20a opens is also provided, such holding circuit extending from the D. C. voltage source E (D. C.) over the relay coil, line 34, contact 21a, connection 25, line 30, contact 31b of relay 32, line 33, connection 28, and contact 29b to ground.

The switch arms 29 and 23 included in the energizing circuits for the wing ice relay 22 and icing weather relay 32 are respectively controlled by means of an instructor's icing humidity control 35 and a pilot's wing anti-ice control 36. The instructor's icing humidity control may be positioned so as to close either contact 29a or contact 29b; however, the system can function to simulate the existence of wing ice only when contact 29b is closed indicating "wet weather" conditions. The instructor sets up "dry weather" conditions by operating the icing humidity control to close contact 29a thereby preventing the apparatus from functioning in a manner simulating the formation of wing ice. The pilot's wing anti-ice control 36 corresponds to a control in the aircraft which may be operated to prevent the formation of ice on the wing by causing an alcohol solution or the like to be sprayed over areas where ice might otherwise form. A position for the anti-ice control 36 in which contact 23a is closed corresponds to the anti-ice device of the aircraft being turned off, and with the contact 23a closed the apparatus my function to indicate the formation of wing ice. The anti-ice device is turned on in the simulator by moving the anti-ice control to open contact 23a and close contact 23b. With contact 23a open the system can function to simulate the existence of wing ice provided the wing ice relay is energized at the time contact 23 opens so that it may be maintained in an energized condition over a holding circuit including the relay contact 37. The system, however, cannot function to simulate the formation of additional ice with contact 23a open.

As has previously been stated, the wing ice relay 22 determines whether the simulated icing and anti-icing system shall indicate the existence or absence of wing ice, wing ice being indicated only when the relay 22 is energized and its contacts 38a and 39a are closed to complete circuits extending from the slider contacts of the potentiometers 40 and 41 to the potentiometers 42 and 43 respectively. As shown, the slider contact 44 of potentiometer 40 connects over line 45, contact 38a and line 46 all in series, and the connection 47 and resistor 47' in parallel with potentiometer 42 when the wing ice relay is energized. Contact 48 of potentiometer 41 connects with potentiometer 43 over line 49, contact 39a, and line 50 in series, and the resistor 51 and connection 52 in parallel when the wing ice relay 22 is energized. The potentiometers 40 and 41 are provided to determine the amount of wing ice simulated in accordance with the poistions of slider contacts 44 and 48 respectively as determined by the setting of the instructor's wing ice control dial 53 which connects with the slider contacts by means of mechanical connections 54. As indicated, one end of the potentiometer card 40 is energized by the A. C. voltage −E, the corresponding end of card 41 being energized by the A. C. voltage −2E. The other ends of the potentiometers 40 and 41 are energized by the A. C. voltages −2E and −E respectively.

The potentiometers 42 and 43 are included in the ($\alpha$) servo 55 and therefore provide output voltages at their slider contacts 56 and 57 respectively depending upon the quantity of wing ice as determined by an instructor and upon the operation of the ($\alpha$) servo. The ($\alpha$) servo is controlled in accordance with input signals derived in the manner shown in the aforesaid copending application S. N. 436,478, which signals are fed to the angle of attack servo amplifier 58. Potentiometer 42 connects with line 46 at opposite ends, one end of the potentiometer connecting with the line 46 through resistor 47' and the other end thereof connecting with line 46 over connection 47. Intermediate points of the potentiometer 42 connect with ground as shown. The potentiometer 43 connects at one end over resistor 51 with the line 50 and connects at an intermediate point to line 50 over the connection 52. The other end of potentiometer card 43 connects through resistor 59 with the A. C. voltage source +2E, whereas the mid-point of the potentiometer connects over line 60 with the A. C. voltage source −E and a point therebetween connects over the line 61 with ground. The design of the potentiometer cards 42 and 43 including the described connections provides for the derivation of the voltage signals $C_{Dp}(WI, \alpha)$ and $C_L(WI, \alpha)$, such signals representing components of coefficient of parasitic drag and coefficient of lift as the functions of wing ice WI and computed angle of attack $\alpha$.

As shown in the aforesaid copending application S. N. 436,478 the signals $C_{Dp}(WI, \alpha)$ and $C_L (WI, \alpha)$ along with other flight factors depending upon the operation of simulated flight controls may be utilized to control the operation of the flight computing system. Such a flight computing system 62 as shown in the aforesaid copending application S. N. 436,478 is provided in applicant's system, the slider contacts 56 and 57 of the potentiometers 42 and 43 respectively being connected thereto over the line 63 and 64 to provide the derived input signals $C_{Dp}(WI, \alpha)$ and $C_L(WI, \alpha)$. The flight computing system includes the air speed meter 65 and the attitude gyro 66 which reflect the existence or absence of wing ice as determined by the described apparatus.

Assuming in the simulated icing and anti-icing system shown in Fig. 1, that the icing weather relay 32 and the wing ice relay are de-energized, the instructor's icing humidity control is so positioned that contact 29a is closed, and the pilot's wing anti-icing control is positioned such that contact 23b is closed, it is impossible to energize either the icing weather relay or the wing icing relay regardless of the position of the outside air temperature servo, nor can either of these relays become energized while either the instructor's humidity control or the pilot's wing anti-ice control occupy the positions indicated. Under such conditions the potentiometers 40 and 41 cannot affect the operation of the flight computing system 62 or the indications on the air speed meter 65 and attitude gyro 66 since the circuits connecting the potentiometers 40 and 41 with the ($\alpha$) servo potentiometers 42 and 43 and thence with the flight computing system are open at contacts 38a and 39a of the wing ice relay 22. Contacts 38b and 39b are closed however so that the potentiometers 42 and 43 connect over such contacts with the A. C. supply voltages —E and —2E respectively whereby the flight computing system 62 and indicating instruments 65 and 66 are caused to operate so as to simulate a condition of no wing ice. Effective simulation of conditions in the aircraft is provided under these circumstances since the position for the instructor's icing humidity control in which contact 29a is closed corresponds to dry weather conditions and the position in which the pilot's wing and anti-ice control causes contact 23b to be closed corresponds to the anti-ice device of the aircraft being turned on and ice cannot form on the wing of the aircraft if either of these circumstances prevail.

Assuming the instructor's icing humidity control 35 is positioned to open contact 29a and close contact 29b, and the pilot's wing anti-ice control 36 is positioned to open contact 23b and close contact 23a, the icing weather relay 32 and the wing ice relay 22 will pick up if the outside air temperature as determined by the (OAT) servo is within the temperature range of $-13°$ C. to $+1°$ C. When the computed value of outside air temperature falls within the indicated range, the cam operated contacts 20a and 21a are closed and an energizing circuit is complete for the icing weather relay 32, such energizing circuit extending from the positive voltage source E (D. C.) over the relay coil, line 34, contact 21a, connections 25 and 26, contact 20a, connections 27 and 28, and contact 29b to ground. Accordingly the icing weather relay 32 picks up whereupon the relay contact 31a opens and contact 32b closes. An energizing circuit is also complete for the wing ice relay 22 extending from the D. C. voltage source E (D. C.) over contact 23a, the relay coil, line 24, contact 21a, connections 25 and 26, contact 20a, connections 27 and 28, and contact 29b to ground. The wing ice relay 22 therefore also picks up whereupon contacts 37b, 38b and 39b are opened and contacts 37a, 38a and 39a are closed. When contacts 38a and 39a close, the slider contacts 44 and 48 of potentiometers 40 and 41 respectively connect with the potentiometers 42 and 43 in the ($\alpha$) servo system to cause the flight computing system 62 and the simulated instruments 65 and 66 to reflect a wing ice condition in degree according to the setting of the wing ice dial 53 as determined by an instructor.

It is to be noted that when the icing weather relay 32 picks up closing its contact 31b a holding circuit is completed for the wing ice relay 22 extending from the D. C. voltage source E (D. C.) over contacts 23a, the relay coil of the wing ice relay, line 24, contact 21a, connection 25, line 30, contact 31b, line 33, connection 28, and contact 29b to ground, so that the wing ice relay is thereafter maintained in an energized condition although contact 20a is caused to open due to the computed value of outside air temperature falling below $-13°$ C. Contacts 33a and 39b are maintained closed and the indicated instruments 65 and 66 continue to reflect a wing ice position according to a predetermined setting on the dial 53. Actual flight conditions are thereby realistically simulated since as hereinbefore stated ice already formed on the aircraft wing remains when the temperature falls below $-13°$ C.; additional ice, however, does not form. Wing ice relay 22 also remains energized to maintain contacts 38a and 39a closed although the pilot's anti-ice control 36 is moved to a position such that contact 23a is opened so that the flight computing system and simulated instruments continue to reflect a wing ice condition. The wing ice relay is maintained energized over the holding circuit which extends from the D. C. voltage source E (D. C.) over contact 37a, the relay coil, line 24, contact 21a, connection 25, line 30, contact 31b, line 33, connection 28, and contact 29b to ground. Operating the pilot's wing anti-ice control 36 to open contact 23a and close the contact 23b, which re-positioning of the control 36 corresponds to turning the aircraft anti-ice device on, should not and does not affect existing ice condition as deflected at the instruments 65 and 66 since the anti-ice device of the aircraft does not affect ice already formed on the wing but merely serves to prevent additional ice from forming.

Assuming that the (OAT) servo is operated to a position corresponding to a computed value of outside air temperature in excess of 1° C., cam operated contact 21a is opened and the icing weather relay 32 and wing ice relay 22 are both caused to drop out since the energizing circuits therefor all include the contact 21a. Contact 31b of relay 32 opens and contact 31a closes, whereas the contacts 37a, 38a and 39a of relay 22 open and the contacts 37b, 38b and 39b close. When contacts 38a and 39a open they disconnect the potentiometers 40 and 41 from the $\alpha$ servo potentiometers 42 and 43 and connect the potentiometers 42 and 43 over contacts 38b and 39b with the A. C. voltage sources —E and —2E respectively whereby the indicating instruments 65 and 66 are caused to reflect a change in icing conditions, i. e. a removal of the ice such as occurs in the aircraft when the temperature exceeds 1° C., causing the ice to crack up and fall off the wing.

The modified system shown in Fig. 2 is similar in all respects to the icing and anti-icing system of Fig. 1 except that the simulated pilot's wing anti-ice control 36 of Fig. 1 is replaced by a simulated pilot's wing de-ice control 100 and timer 102, and except that the contact 37a of Fig. 1 has been omitted to eliminate a holding circuit for the wing ice relay 22. The remaining apparatus and circuitry for the system of Fig. 2 corresponds to the apparatus and circuitry of Fig. 1. Because of the correspondence between the apparatus and circuitry of Figs. 1 and 2 only a portion thereof is shown in Fig. 2. Apparatus and circuitry in Fig. 2 which is identical with apparatus and circuitry shown in Fig. 1 bear the same reference characters except that a prime mark (') has been added to the reference characters of Fig. 2.

The icing and de-icing system of Fig. 2 is operated in the same manner as the icing and anti-icing system of Fig. 1 except that by reason of the elimination of the holding circuit for the wing ice relay 22, the wing ice relay is caused to drop out whenever the de-ice control 100 is positioned to open the contact 101a whereupon the system reflects a removal of wing ice. The timer 102 introduces a time element into the system, i. e., a time delay is injected between the time of operating the control 100 and the opening or closing of contact 101a or 101b which time delay corresponds to the time required in the aircraft for the de-ice device which is generally of an electric heating type, to heat up sufficiently to cause the ice to melt and fall off the wing, or to cool off permitting ice to form.

The effect of wing ice on flying characteristics is graphically illustrated in Figs. 3 and 4 of the drawings. Fig. 3 shows the manner in which coefficient of lift $C_L$ varies with angle of attack $\alpha$ in the case of an aircraft flying with a considerable quantity of wing ice and in the case of the same aircraft without wing ice. As indicated, at low angles of attack the ice does not seem to affect the lift coefficient, but at high angles the effect is pronounced and if the pilot does not know of the ice he may stall the aircraft in an attempt to climb or turn. Obviously it is desirable to train pilots on the ground to contend with icing conditions by means of apparatus such as shown and described herein. Fig. 4 shows the effect of wing ice on drag, basically the effect being to increase the airplane's coefficient of parasitic drag.

It should be undertsood that this invention is not limited to specific details of construction and arrangement thereof herein illustrated, and that changes and modifications may occur to one skilled in the art without departing from the spirit of the invention.

What is claimed is:

1. In ground-based training apparatus for aircraft personnel, said apparatus having flight computing means operable according to simulated flight conditions for representing and indicating airspeed and aircraft attitude, a system for simulating wing icing of aircraft comprising means responsive to said computing means and operable according to a function of simulated outside air temperature, means operable by an instructor according to simulated humidity, and control means for representing an icing condition according to predetermined relations of air temperature and humidity responsive to joint operation of said outside air temperature and humidity means, said flight computing means being responsive to said control means for modifying the airspeed and attitude indications in simulation of wing icing.

2. In traning apparatus as set forth in claim 1 in which the control means for representing an icing conditon comprises an electrical relay system that is adapted to control the application of potential to said computing means for representing icing and no-icing conditions respectively.

3. In training apparatus as set forth in claim 1 in which the outside air temperature function means comprises a servo-operated switching system operable within an icing weather temperature range for controlling the operation of said icing condition control means.

4. In training apparatus as set forth in claim 1 in which the icing condition control means selectively controls the application of a plurality of control voltages from a plurality of sources respectively to said computing means for affecting lift and drag computations according to simulated wing icing or no-icing conditions.

5. In training apparatus as set forth in claim 4, in which a plurality of voltage deriving means are adjustable by an instructor, for varying the magnitude of certain of said control voltages throughout a range representing no-ice to heavy ice.

6. In training apparatus as set forth in claim 4, in which switching circuits are controlled by said icing condition control means for applying constant potential to said computing means to represent no-icing, and for alternatively applying potential variable by an instructor to said computing means to represent heavy to no-ice conditions.

7. In training apparatus as set forth in claim 4, in which the icing condition control means comprises an electrical relay system that is controlled by a time-delay switch representing a pilot's de-ice switch.

8. In training apparatus as set forth in claim 1, in which the outside air temperature means comprises a pair of switching devices operable respectively to control positions representing the upper (0° C.) and lower (—13° C.) temperature limits of a simulated icing weather range, and a holding relay connected to said switching devices and adapted to be initially energized through a circuit controlled jointly by said devices, said relay thereby providing an energizing circuit for said icing condition control means independently of the device representing the lower temperature limit and depending on the device representing the upper temperature limit.

9. In training apparatus as set forth in claim 8 in which the holding relay and the icing condition control means are both controlled by a switch operable according to the instructor's humidity control.

10. In training apparatus as set forth in claim 8 in which the icing condition control means also comprises an electrical relay, a switch representing a pilot's anti-ice control for controlling initial energization of said icing condition relay, said relay having a holding circuit independent of said anti-ice control whereby a de-ice condition of said relay is dependent on the condition of said upper limit switching device.

11. In training apparatus as set forth in claim 3 in which said icing condition control means comprises a relay having an energizing circuit controlled by said switching system, a first switch representing an instructor's humidity control and a second switch representing a pilot's de-ice switch.

12. In training apparatus as set forth in claim 1 wherein the outside air temperature function means comprises a servo system responsive to the computing means according to simulated altitude and a switching system controlled by said servo system and operable to represent an icing weather temperature range, said switching system adapted to control the icing condition control means whereby de-icing may be simulated by decreasing the altitude of the simulated flight.

13. In ground-based training apparatus for aircraft personnel, said apparatus having flight computing means operable according to simulated flight conditions for representing and indicating airspeed, altitude and aircraft attitude, a system for simulating wing icing and de-icing of aircraft comprising a servo system responsive to said computing means and operable according to a function of simulated outside air temperature, a switching system controlled by said servo system and operable within ranges representing icing weather temperature and non-icing weather temperature and a relay representing a wing-ice condition arranged to be controlled by said switching means, said relay being adapted to control circuits affecting the operation of said flight computing means for modifying the airspeed and attitude indications thereof in simulation of wing icing and de-icing, said switching system being adapted to change the condition of said wing-ice relay from an "icing" condition to a "de-iced" condition upon operation of said servo system to a higher temperature indication in response to decrease of altitude of the simulated flight.

14. In training apparatus as set forth in claim 13 wherein the switching system is connected to an additional switch operable by an instructor to positions representing "wet weather" and "dry weather" arranged so that the wing-ice relay cannot be operated to the "icing" condition when the instructor's switch is at the "dry weather" position.

References Cited in the file of this patent

UNITED STATES PATENTS 2,584,261   Davis et al. _____ Feb. 5, 1952

UNITED STATES PATENT OFFICE
CERTIFICATE OF CORRECTION

Patent No. 2,803,893

August 27, 1957

Robert G. Stern

It is hereby certified that error appears in the printed specification of the above numbered patent requiring correction and that the said Letters Patent should read as corrected below.

Column 2, line 20, for "voltage" read -- voltages --; same line, for "vary" read -- varying --; column 4, line 9, for "my" read -- may --; column 6, line 34, for "deflected" read -- reflected --.

Signed and sealed this 3rd day of December 1957.

(SEAL)
Attest:

KARL H. AXLINE
Attesting Officer

ROBERT C. WATSON
Commissioner of Patents